July 28, 1959 — C. BRANDON — 2,896,498

DEROTATION PRISM

Filed Feb. 7, 1955 — 2 Sheets-Sheet 1

INVENTOR.
CHESTER BRANDON
BY Theodore H. Lassagne
ATTORNEY

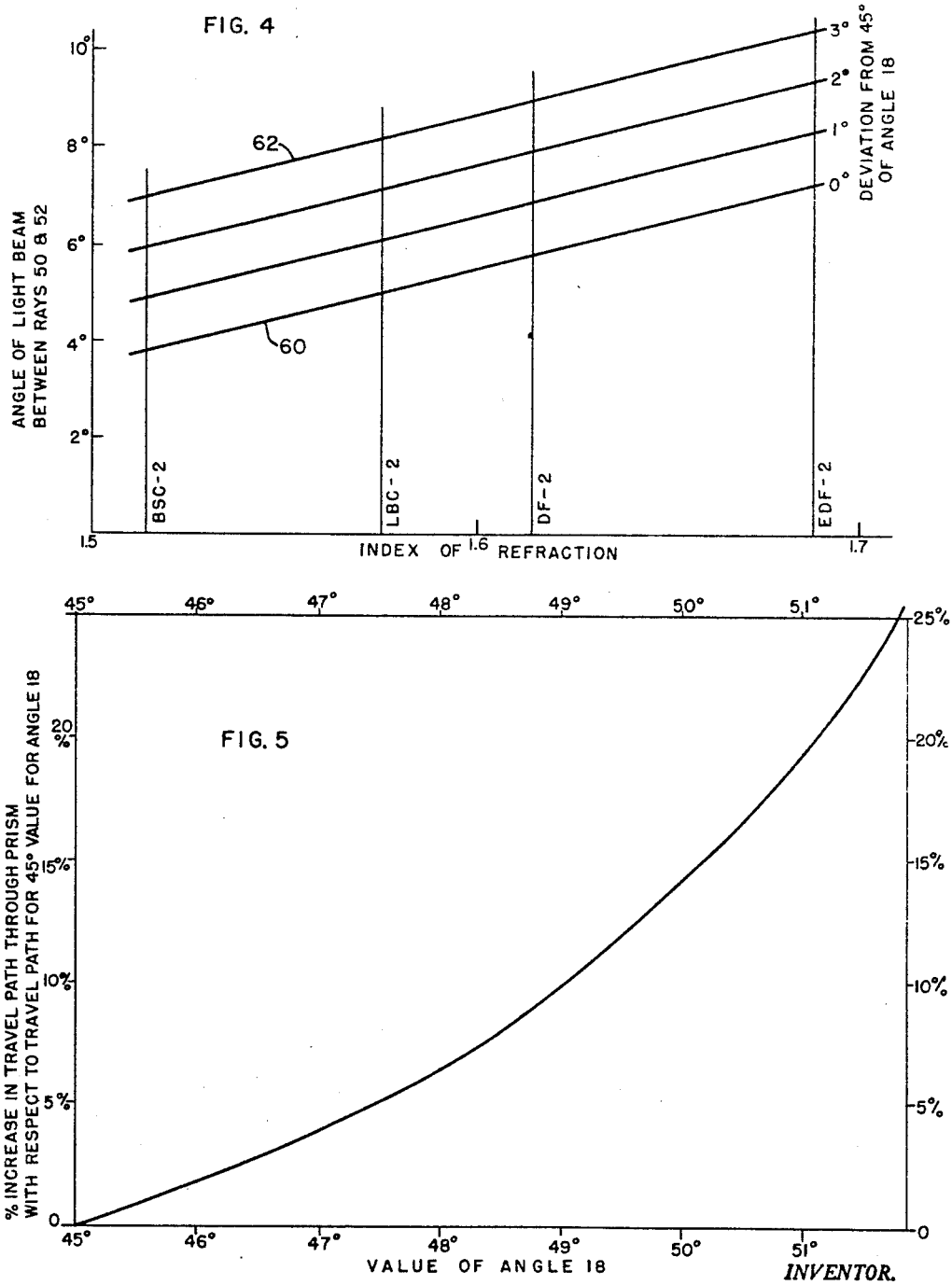

2,896,498

Patented July 28, 1959

United States Patent Office

2,896,498

DEROTATION PRISM

Chester Brandon, La Canada, Calif., assignor to Librascope, Incorporated, Glendale, Calif., a corporation of California Application February 7, 1955, Serial No. 486,349

5 Claims. (Cl. 88—1)

The present invention relates to optics and more particularly to improvements in prisms of the kind known as "derotation" prisms, of the Schmidt or "Z" type.

Prisms of this type are used, for example, in periscopes in which the observer occupies a fixed position while the aperture through which the image is viewed rotates. In such instruments the presentation of the image to the observer would, in the absence of a prism of the type to which this invention relates, rotate or "tumble" as the aperture rotated. For this reason, derotation prisms, one type of which is the Schmidt prism, also known as a "Z" prism, have been conventionally used to maintain the presentation of the image to the observer erect, regardless of the rotational position of the aperture. Because such prisms rotate an image at twice the speed at which the prism itself is rotated, they are conventionally carried in mountings geared to the head in which the aperture is disposed so that they rotate at half the speed of the head.

The Schmidt prism has been satisfactory in systems in which all rays enter the prism in parallel relation, but its adaptation to systems in which rays enter the prism at angles to a reference line has presented serious problems. Such adaptation has, in the prior art, been effected by the employment of dense optical glasses, the density increasing with the divergence of the rays to be accommodated. Such glasses not only are costly, but their light transmission decreases as the density increases, and they are undesirable from the point of view of workability, internal stresses, and the like.

The present invention accomplishes the adaptation of Schmidt-type prisms to systems in which non-parallel rays enter the prisms in such a way as to make possible the use of glass having a relatively low index of refraction. The adaptation is effectuated without sustaining losses in the light transmitted which are as great as would be involved in achieving the same result by increasing the index of refraction of the glass used.

This is achieved, in summary, by rendering the prism asymmetrical; altering the angles of the contiguous faces of the two elements constituting the prism assembly so that they are no longer disposed at the conventional 45° angle, and correspondingly altering the dimensions of the elements to maintain unchanged the angular relation between rays entering and leaving the prisms.

In the drawings:

Figures 4 and 5 show curves which graphically illustrate the advantages of, and certain limitations in, the present system.

Figure 1:
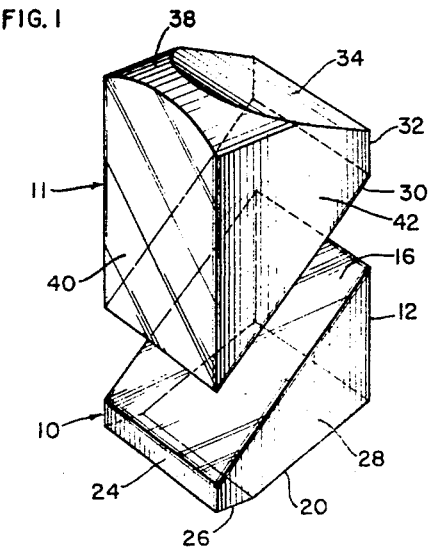
Figure 1 is an exploded perspective view of a pair of prisms constituting one embodiment of the invention.
Figure 2:
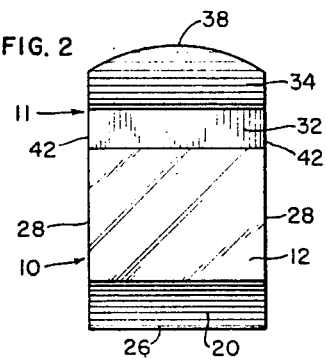
Figure 2 is a side elevational view in their operative relationship of the prisms shown in Figure 1.

In the embodiment shown in the drawings, a pair of prisms generally indicated at 10 and 11 are provided with a plurality of optical surfaces. The prisms 10 and 11 may be made from suitable optical material such as borosilicate crown glass having an index of refraction of approximately 1.517. As will be disclosed in detail hereinafter, this glass has certain advantages because of its relatively low index of refraction and because of its low cost and common use in prisms.

The prism 10 has a first surface 12 which may be polished to a flatness within one quarter wave length of light. The prism 10 is disposed so that the surface 12 faces a beam of light 14 with the surface 12 disposed in substantially perpendicular relationship to the axis of the light beam. As will be described in detail hereinafter, the beam 14 may be formed from parallel or non-parallel rays. The prism 10 has a second surface 16 which is also polished to a flatness within one quarter wave length of light. The surface 12 forms a particular angle 18 greater than 45 degrees with the surface 12. This angle is dependent upont the angle of convergence or divergence of the light beam 14. For example, the surface 16 may form an angle of 48 degrees with the surface 12 when the light beam 14 has an angle of convergence or divergence of approximately 7° between its axis and its periphery.

The prism 10 has a third surface 20 which extends from the surface 12 at a particular angle 22 such as an angle of 108 degrees relative to the surface 12. The surface 20 is polished to a flatness within one quarter wave length of light in a manner similar to that described above. The surface 20 is then silvered, copper-plated, coated with one or two thin coats of a suitable material such as shellac, and finally coated with one or two layers of a suitable waterproofing compound.

A surface 24 extends from the surface 16 in parallel relationship to the surface 12. The surface 24 is ground and blackened for reasons which will be described in detail hereinafter. A surface 26 extends from the blackened surface 24 in substantially perpendicular relationship to this surface and communicates with the surface 20. The surface 26 may be ground and blackened in a manner similar to the surface 24.

A pair of side surfaces 28 join the surfaces 12, 16, 20, 24 and 26 in parallel relationship to each other and in perpendicular relationship to the other surfaces. The surfaces 28 are ground and blackened in a manner similar to that described above for the surfaces 24 and 26.

The prism 11 is provided with a first surface 30 having a length corresponding substantially to that of the surface 16. In this way, the surface 30 may be disposed in contiguous relationship to the surface 16 over the full areas of the surfaces so as to be separated by a distance of approximately 0.01 inch from the surface 16. The surface 30 is ground to a flatness within one quarter wave length of light in a manner similar to the surface 16. A surface 32 extends from the surface 30 in a direction substantially parallel to the surface 12 such that an angle of 132 degrees (180°–48°) is formed between the surfaces 30 and 32. The surface 32 is ground and blackened in a manner similar to that disclosed above for the surfaces 24 and 26.

A third surface 34 has a common boundary with the surface 32 and extends from the surface 32 at a suitable angle 36 such as an angle of 114 degrees. The surface 34 is polished to a flatness within one quarter of wave length of light, silvered, copper plated and coated with layers of shellac and waterproofing compound in a manner similar to that described above for the surface 20. The surface 34 may be curved as at 38 at positions removed from the surface 32 for purposes of mounting the prism. As will be seen in the drawings, the surface 34 forms an asymmetrical arrangement with the surface 20 relative to the surfaces 12 and 32.

A surface 40 is substantially parallel to the surface 32 and forms a substantially continuous plane with the surface 24 and also forms the angle 18 relative to the surface 30. As disclosed above, the angle 18 has a value greater than 45 degrees, a particular example of 48 degrees having been disclosed. The surface 40 is polished to a flatness within one quarter wave length of light. A pair of parallel surfaces 42 join the surfaces 30, 32, 34 and 40 in perpendicular relationship to these surfaces. The surfaces 40 are ground and blackened in a manner similar to that disclosed above for the other surfaces.

The edges defined by the boundaries between adjacent pairs of surfaces in the prisms 10 and 12 are preferably rounded. For example, the edges may be chamfered to a roundness of 0.1 x 0.1 millimeters.

Figure 3:
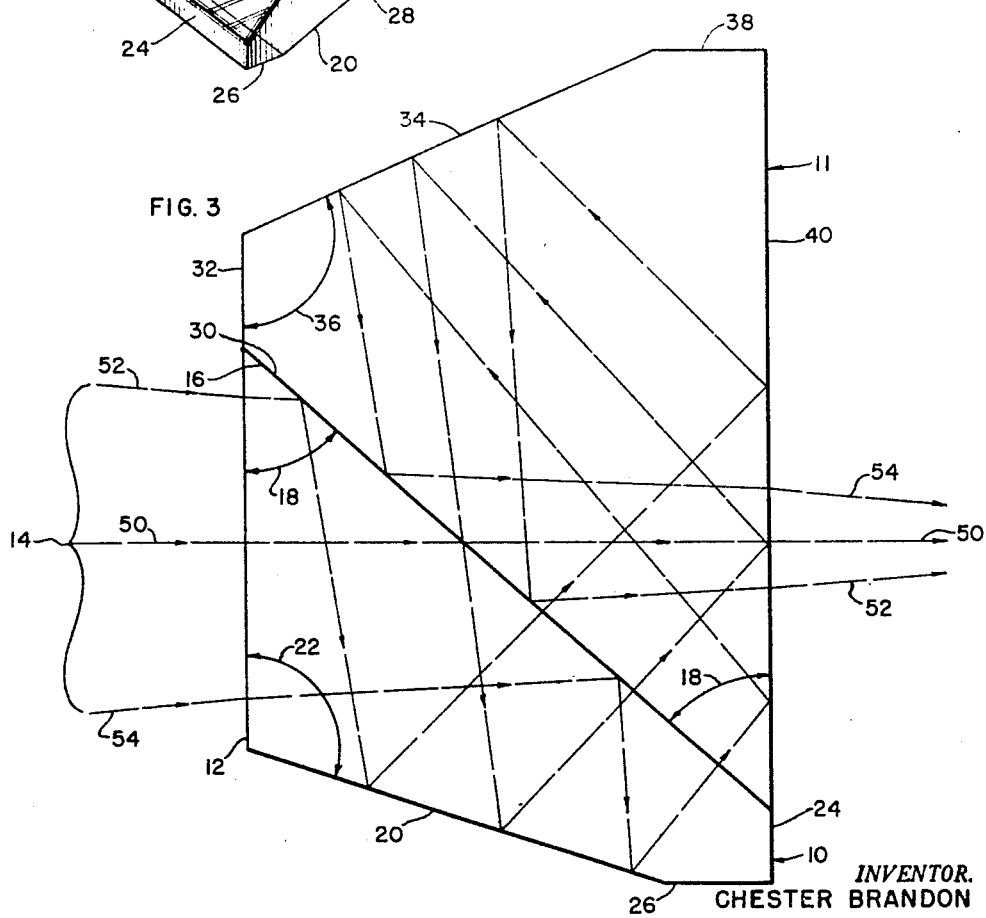
Figure 3 is an enlarged front elevational view in their operative relationship of the prisms shown in Figures 1 and 2 and shows in broken lines the paths of movement of different light rays through the prisms.

Since the light 14 travels in a direction substantially perpendicular to the surface 12, it passes through the surface and into the prism 10 without any appreciable change in direction. The light 14 may be formed from parallel, converging or diverging rays. For purposes of illustration, a converging beam of light is shown in broken lines in Figure 3 and is defined by rays 50, 52 and 54. It should be understood, however, that the rays 50, 52, and 54 shown in Figure 3 are a sectional view of the entering light image and that these entering rays of light are actually in the form of a bundle or cone. The ray 50 is located along the axis of the light image 14 and the rays 52 and 54 define opposite extremities of the light image 14 as the image travels in a converging path. The angle between the ray 50 and each of the rays 52 and 54 may be a suitable angle such as approximately 5°.

The rays 50, 52 and 54 travel through the prism 10 towards the surface 16 and impinge on the surface at angles greater than the critical angle relative to a line extending normal to the surface. For this reason, the surface 16 does not pass any of the rays 50, 52 and 54 but reflects these rays towards the surface 20 as seen by the broken lines in the drawing.

The rays reflected by the surface 16 are in turn reflected by the surface 20 because of the plating such as the silver and copper plating on the surface. After the rays 50, 52 and 54 have been reflected by the surface 20, they travel back toward the surface 16 in a direction substantially normal to the surface. Because of this perpendicular relationship, the rays 50, 52 and 54 travel through the surface 16 and reach the surface 30. Since the surface 30 is parallel to the surface 16, the light rays also travel through the surface 30 and subsequently reach the surface 40.

The rays 50, 52 and 54 impinge on the surface 40 in a direction to produce a relatively great angle with the normal of the surface. This angle is greater than the critical angle, thereby causing the rays to be reflected by the surface 40. The rays then travel to the surface 34 which reflects the rays because of its coating of suitable material such as silver and copper. After reflection from the surface 34, the rays 50, 52 and 54 travel back to the surface 30 at an angle greater than the critical angle relative to the normal of the surface. This causes the surface 30 to reflect the rays so that the rays travel towards the surface 40.

As will be seen in the drawings, the ray 50 travels towards the surface 40 in a direction substantially perpendicular to the surface and at a position to form a continuation of its line of movement towards the prism 12. After reflection from the surface 30, the ray 52 travels in the same direction as the ray 54 during the movement of the ray 54 towards the prism 12. In like manner, the ray 54 travels towards the surface 40 in the same direction as the movement of the ray 52 towards the surface 12. In this way, the light image 14 is inverted relative to its appearance during its movement towards the prism 12. The light image reflected from the surface 30 then travels through the surface 40 for subsequent use in such systems as periscopes.

The prism constituting this invention is especially adapted for use in periscopes. As the aperture in the periscope is rotated, the prism constituting this invention is rotated at a substantially half speed relative to the movement of the prism. The prism acts on the image passing through the aperture to maintain the image in fixed position at the viewing position of the periscope so that a person looking at the image can remain in fixed position even while the image is being scanned. The prism passes the full image entering the aperture whether the image is formed from parallel rays or from non-parallel rays such as converging or diverging rays.

The optical system described above has several important advantages. It receives a parallel, converging or diverging beam of light such as a beam defined by the rays 50, 52 and 54 and inverts this beam without losing any part of the beam—or, as is technically known, without occulting or vignetting. The optical system obtains this inversion by disposing the surfaces 16 and 30 to form angles 18 greater than 45° with the surfaces 12 and 40. The particular value in excess of 45° for the angle 18 is dependent upon the angle formed between the axial ray 50 and the peripheral rays 52 and 54 and upon the particular material used for the prisms. For example, the angle 18 may have a value of 48° when the angle between the axial ray 50 and each of the rays 52 and 54 is approximately 7° and when the prisms 10 and 11 are made from a suitable material such as borosilicate crown glass having an index of refraction of approximately 1.517.

The optical system described above also inverts a converging or diverging beam without losing any part of the beam by disposing the surfaces 20 and 34 in asymmetrical relationship to the surfaces 12 and 32. The optical system obtains this inversion without having to use optical materials having high indices of refraction, which would otherwise be necessary to make certain that substantially all of the light in the beam 14 is reflected at the proper times from the surfaces 16 and 30. Optical materials having high indices of refraction are undesirable since they attenuate light considerably. They are also difficult to work with, are relatively costly and expensive and stain and abrade easily.

By changing the angles as described above and by producing the asymmetries between the surfaces 20 and 34, optical material such as borosilicate crown glass having a relatively low index of refraction can be used. This material has none of the disadvantages listed in the previous paragraph for dense glass. It causes the system described above to produce an inverted light image which is considerably stronger than the inverted image which can be obtained by using optical material having a high index of refraction in a conventional Schmidt prism. The image obtained by the prism constituting this invention is considerably stronger than that obtained by Schmidt prisms using dense glass even though the image must travel through a distance which is approximately 10% greater than in the previous systems.

The advantage obtained from the invention described above and shown in the drawings may be seen by reference to Figure 4. In Figure 4, it may be seen from curve 60 that material such as that designated as EDF-2 and having an index of refraction of approximately 1.7 is necessary when the angle between the rays 50 and 52 is approximately 7° and the angle 18 is approximately 45°. Such a system would have all of the disadvantages described above by using a relatively dense material such as EDF-2, including the disadvantages of high attenuation and high cost. However, by increasing the angle 18 to approximately 48°, material designated as BSC-2 having an index of refraction of approximately 1.517 can be used when the angle between the rays 50 and 52 is approximately 7°. This may be seen from curve 62 in Figure 4. Material having an index of refraction of approximately 1.517 is desirable for a number of different reasons as described above, two of the main reasons being its good properties of light transmission and its low cost.

The apparatus described above is adaptable for use only over a certain range of values for the angle 18. As a practical matter, this range extends up to a value of 51° or 52° for the angle 18. This may be seen from the curve shown in Figure 5. This curve illustrates that the minimum travel path of the light rays through the prism increases progressively with increases in the angle 18. For example, a change in the angle 18 from a value of 45° to a value of 46° produces an increase of approximately only 2% in the length of the light travel path through the prism. However, a change in the angle 18 from a value of 51° to a value of 52° produces an increase of approximately 8% in the length of the light travel path through the prism.

Since the light becomes attenuated as it travels through the prisms, an increase in the length of the light travel path causes the attenuation of the light to be increased. For this reason, the angle 18 has a practical limit of approximately 51° or 52°. At this limit, the advantages gained by increasing the angle 18 and using a material of low index of refraction are offset by the added attenuation resulting from the increase in the light travel path through the prisms.

What is claimed is:

1. A modified Schmidt prism for inverting the relative disposition of the rays in a light beam having a conical configuration, including, a first prism made from a material having an index of refraction of 1.517, the first prism having a first surface, and having a second surface contiguous to the first surface and forming an angle of 48° with the first surface to totally reflect light passing to it from the first surface, and having a third surface contiguous to the first surface and forming an angle of 108° with the first surface and coated with a material to reflect light; and a second prism made from a material having an index of refraction of 1.517, the second prism having a first surface parallel to the first surface on the first prism, and having a second surface contiguous to the first surface on the second prism and forming an angle of 48° with the first surface on the second prism, and having a third surface contiguous to the first surface on the second prism and forming an angle of 114° with the first surface on the second prism and coated with a material to reflect light and disposed relative to the second surface to obtain a total reflection by the second surface of the light passing to the second surface from the third surface and to obtain the passing through the first surface of the light reflected by the second surface.

2. A modified Schmidt prism for inverting the relative disposition of the rays in a light beam having a conical configuration, including, a first prism having a first planar surface disposed to pass the light beam, and having a second surface disposed at a particular angle in the range of 46° to 51° relative to the first surface to totally reflect the light passing through the first surface, and having a third surface coated to reflect the light passing to it from the second surface and disposed at a particular angle relative to the first surface to pass through the second surface the light reflected by it and to pass the median ray of the light beam through the second surface in a direction perpendicular to the second surface; and a second prism having a first surface parallel to the first surface on the first prism to reflect the light passing through the second surface of the first prism, and having a second surface disposed in contiguous relationship to the second surface on the first prism to form the particular angle with the first surface on the second prism, and having a third surface coated to reflect the light passing to it from the first surface of the second prism and disposed at a particular angle relative to the first surface on the second prism to pass the median ray of the light beam to the position on the second surface of the second prism corresponding to the position of the median ray on the second surface of the first prism and to obtain a total reflection of the median ray from the second surface of the second prism in a direction coincident with the direction of the median ray as it enters into the first prism.

3. The modified Schmidt prism set forth in claim 2 in which the third surfaces on the first and second prisms have an asymmetrical relationship to each other.

4. A modified Schmidt prism for inverting the relative disposition of the rays in a light beam having a conical configuration, including, a first prism having a first surface disposed in a direction substantially perpendicular to the median ray of the light beam, and having a second surface disposed at an angle in the range of 46° to 51° relative to the first surface to totally reflect light passing from the first surface to the second surface, and having a third surface coated with a material to reflect light and disposed relative to the second surface to receive the light reflected from the second surface and to reflect this light in a direction for total passage through the second surface; and a second prism having a first surface disposed in a direction substantially parallel to the first surface on the first prism, and having a second surface disposed at an angle relative to the first surface on the second prism corresponding to the angle between the first and second surfaces on the first prism and disposed in contiguous relationship to the second surface on the first prism to pass the light passing through the second surface on the first prism and disposed relative to the first surface on the second prism to obtain a total reflection by the first surface of the light passing to the first surface of the second prism from the second surface of the second prism, and having a third surface coated with material to reflect the light passing to the third surface from the first surface of the second prism and disposed relative to the second surface of the second prism to obtain a total reflection by the second surface of the second prism of the light passing to it from the third surface of the second prism and to obtain a passage of the light through the first surface of the second prism after the reflection of the light by the second surface of the second prism.

5. The modified Schmidt prism set forth in claim 4 in which the third surfaces on the first and second prisms are asymmetrically disposed relative to each other.

References Cited in the file of this patent

UNITED STATES PATENTS

| 2,550,962 | Brandon | May 1, 1951 |
| 2,678,580 | Erban | May 18, 1954 |
| 2,784,645 | Grey | Mar. 12, 1957 |

FOREIGN PATENTS

| 11,556 | Great Britain | June 2, 1899 |
| 115,101 | Great Britain | May 2, 1918 |
| 1,010,654 | France | Mar. 26, 1952 |